US012694474B2

(12) United States Patent (10) Patent No.: US 12,694,474 B2
Choi et al. (45) Date of Patent: Jul. 28, 2026

(54) IMAGE PROCESSING APPARATUS AND METHOD OF GENERATING MODEL FOR IMAGE PROCESSING

(71) Applicant: SAMSUNG ELECTRONICS CO., LTD., Suwon-si (KR)

(72) Inventors: Hee Min Choi, Suwon-si (KR); Hyo A Kang, Suwon-si (KR); Su Ji Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 256 days.

(21) Appl. No.: 18/660,939

(22) Filed: May 10, 2024

(65) Prior Publication Data

US 2025/0014145 A1     Jan. 9, 2025

(30) Foreign Application Priority Data

Jul. 7, 2023     (KR) ........................ 10-2023-0088119

(51) Int. Cl.
G06T 3/4053     (2024.01)
G06V 10/77     (2022.01)
G06V 10/82     (2022.01)

(52) U.S. Cl.
CPC ........ G06T 3/4053 (2013.01); G06V 10/7715 (2022.01); G06V 10/82 (2022.01)

(58) Field of Classification Search
CPC ... G06T 3/4053; G06T 3/4046; G06T 3/4007; G06T 2207/20084; G06V 10/7715; G06V 10/82; G06N 3/0475; G06N 3/045
See application file for complete search history.

(56) References Cited

U.S. PATENT DOCUMENTS 10,134,110 B1     11/2018  Liu et al.
10,489,887 B2     11/2019  El-Khamy et al.
(Continued)

FOREIGN PATENT DOCUMENTS

CN          111353940 A  *  6/2020  ............. G06N 3/045
CN          111968195 A  *  11/2020  ............. G06N 3/045
(Continued)

OTHER PUBLICATIONS

Zhou, Lin, Haoming Cai, Jinjin Gu, Zheyuan Li, Yingqi Liu, Xiangyu Chen, Yu Qiao, and Chao Dong. "Efficient image super-resolution using vast-receptive-field attention." In European conference on computer vision, pp. 256-272. Cham: Springer Nature Switzerland, 2022. (Year: 2022).*
(Continued)

*Primary Examiner* — Carol W Chan
(74) *Attorney, Agent, or Firm* — Sughrue Mion, PLLC

(57) ABSTRACT

A method of generating a model for image processing includes increasing, using a receptive field (RF) increasing module of at least one processor, a receptive field of an input image frame; generating, using a feature extraction (FE) module of the at least one processor, a feature map based on the input image frame with an increased receptive field; generating, using a super resolution (SR) module of the at least one processor, a target image having a target resolution, based on the feature map; and generating, using a model generation (MG) module of the at least one processor, a replacement model that replaces at least one of the RF increasing module, the FE module, and the SR module.

19 Claims, 8 Drawing Sheets

(56)  References Cited

U.S. PATENT DOCUMENTS

| | | | |
|---|---|---|---|
| 10,970,820 B2 | 4/2021 | El-Khamy et al. | |
| 11,158,286 B2 | 10/2021 | Yaacob et al. | |
| 11,694,305 B2 | 7/2023 | El-Khamy et al. | |
| 12,148,200 B2 * | 11/2024 | Lu | G06V 10/80 |
| 2013/0155272 A1 | 6/2013 | Imade | |
| 2021/0125313 A1 * | 4/2021 | Bai | G06T 5/60 |
| 2022/0261959 A1 | 8/2022 | Zhang et al. | |
| 2023/0100615 A1 | 3/2023 | Yuan et al. | |

FOREIGN PATENT DOCUMENTS

| | | | | | |
|---|---|---|---|---|---|
| CN | 112308200 A | * | 2/2021 | | G06N 3/045 |
| CN | 112801877 A | | 5/2021 | | |
| CN | 114372918 A | * | 4/2022 | | G06F 18/253 |
| CN | 114663288 A | * | 6/2022 | | G06N 3/045 |
| CN | 115526773 A | * | 12/2022 | | G06T 3/4053 |
| CN | 115719463 A | * | 2/2023 | | |
| CN | 116758340 A | * | 9/2023 | | G06V 10/764 |
| CN | 116863289 A | * | 10/2023 | | G06V 10/806 |
| JP | 2013-126123 A | | 6/2013 | | |
| KR | 10-2059529 B1 | | 12/2019 | | |
| KR | 10-2020-0059627 A | | 5/2020 | | |
| KR | 10-2242334 B1 | | 4/2021 | | |
| KR | 10-2479965 B1 | | 12/2022 | | |

OTHER PUBLICATIONS

Soo Ye Kim et al., "FISR: Deep Joint Frame Interpolation and Super-Resolution with a Multi-Scale Temporal Loss", Proceeding of the Thirty-Fourth AAAI Conference on Artificial Intelligence (AAAI-20), vol. 34, No. 7, 2020, pp. 11278-11286.

Liying Lu et al., "Video Frame Interpolation with Transformer", Proceedings of the IEEE/CVF Conference on Computer Vision and Pattern Recognition (CVPR), 2022, pp. 3532-3542.

Younghyun Jo et al., "Practical Single-Image Super-Resolution Using Look-Up Table", Proceedings of the IEEE/CVF Conference on Computer Vision and Pattern Recognition (CVPR), 2021, pp. 691-700.

Myungsub Choi et al., "Channel Attention Is All You Need for Video Frame Interpolation", Proceeding of the Thirty-Fourth AAAI Conference on Artificial Intelligence (AAAI-20), vol. 34, No. 7, 2020, pp. 10663-10671.

David Ha et al., "HyperNetworks", Dec. 1, 2016, 29 pages, arXiv:1609.09106v4 [cs.LG].

\* cited by examiner

IMAGE PROCESSING APPARATUS AND METHOD OF GENERATING MODEL FOR IMAGE PROCESSING

CROSS-REFERENCE TO RELATED APPLICATIONS

This application claims benefit of priority under 35 U.S.C. § 119 to Korean Patent Application No. 10-2023-0088119, filed on Jul. 7, 2023, in the Korean Intellectual Property Office, the disclosure of which is incorporated by reference herein in its entirety.

BACKGROUND

1 Field

The present disclosure relates generally to image processing, and more particularly, to an image processing apparatus and a method of generating a model for image processing.

2. Description of Related Art

Related super resolution techniques may relate to the converting of a low-resolution image to a high-resolution image and related frame interpolation techniques may relate to the generating of intermediate frames between two frames. Such techniques may exhibit characteristics in that computational resources and/or processing speed may increase exponentially as the resolution of an original image increases.

Therefore, there exists a need for further improvements in image processing, as an increasing demand for rapid image processing of high-resolution images that may maintain high performance may be constrained by computational resources and/or processing speed needed by related image processing techniques.

SUMMARY

One or more example embodiments of the present disclosure provide a method of generating a model for context-based adaptive image processing by increasing a receptive field, and an image processing apparatus thereof.

According to an aspect of the present disclosure, a method of generating a model for image processing, the method includes increasing, using a receptive field (RF) increasing module of at least one processor, a receptive field of an input image frame, generating, using a feature extraction (FE) module of the at least one processor, a feature map based on the input image frame with an increased receptive field, generating, using a super resolution (SR) module of the at least one processor, a target image having a target resolution, based on the feature map, and generating, using a model generation (MG) module of the at least one processor, a replacement model that replaces at least one of the RF increasing module, the FE module, and the SR module.

In some embodiments, the method may further include preprocessing, using a preprocessing module of the at least one processor, the input image frame.

In some embodiments, the input image frame may include a first image frame and a second image frame, the preprocessing of the input image frame may include converting the first image frame and the second image frame based on at least one of an average value of the first image frame and the second image frame and an interpolated value between the first image frame and the second image frame, and the increasing of the receptive field of the input image frame may include increasing, using the RF increasing module, a first receptive field of the first image frame and a second receptive field of the second image frame.

In some embodiments, the increasing of the receptive field of the input image frame may include performing at least one of a down shuffle, a channel-wise concatenation, and a dimension reduction.

In some embodiments, the method may further include training, using a training module of the at least one processor, at least one of the RF increasing module, the FE module, and the SR module, the training module being based on the target image and a ground truth image, and the generating of the replacement model may include generating, based on completion of the training, the replacement model based on a training result.

In some embodiments, the replacement model may include a lookup table that maps inputs of a module to be replaced to outputs of the module to be replaced.

In some embodiments, the generating of the replacement model may include generating one or more replacement models for each module to be replaced, based on context of the input image frame.

In some embodiments, the method may further include generating, using a weight generation (WG) module of the at least one processor, weights for each layer of a feature extraction neural network based on a result of the increasing of the receptive field, and the generating of the feature map may include applying the weights to the feature extraction neural network, and providing the result of the increasing of the receptive field to the feature extraction neural network.

In some embodiments, the generating of the feature map further may include quantizing output values of the feature extraction neural network, and the generating of the target image may include dividing the quantized output values into a plurality of units of a predetermined size, and generating a predicted pixel value of the target image for each unit of the plurality of units.

In some embodiments, the generating of the replacement model may include resizing a lookup table that replaces the SR module, and performing, for each unit of the plurality of units, at least one of adjustment of a size unit and sampling.

In some embodiments, the generating of the weights may include applying a predetermined sparsity to the weights of each layer of the feature extraction neural network.

In some embodiments, the generating of the weights may include clustering, using a clustering algorithm, the result of the increasing of the receptive field.

In some embodiments, the method may further include performing at least one of super resolution, frame interpolation, and frame interpolation after super resolution.

In some embodiments, the generating of the target image may include, based on performing only the frame interpolation, converting the target image having the target resolution to have a same resolution as at least one of a first frame of the input image frame and a second frame of the input image frame.

According to an aspect of the present disclosure, a non-transitory computer-readable recording medium storing one or more computer-executable programs includes instructions for generating a model for image processing that, when executed by at least one processor of a device, cause the device to increase, using an RF increasing module of at least one processor, a receptive field of an input image frame, generate, using an FE module of the at least one processor, a feature map based on the input image frame with an increased receptive field, generate, using an SR module of the at least one processor, a target image based on the feature map, the target image having a target resolution, and generate, using an MG module of the at least one processor, a replacement model that replaces at least one of the RF increasing module, the FE module, and the SR module.

According to an aspect of the present disclosure, an image processing apparatus, includes a memory configured to store a model for image processing, and a processor configured to generate the model for image processing, store the model for image processing in the memory, and perform image processing by using the model. The processor includes an RF increasing module configured to increase a receptive field of an input image frame, an FE module configured to generate a feature map based on the input image frame with an increased receptive field, an SR module configured to generate a target image having a target resolution, based on the feature map, and an MG module configured to generate the model for image processing and to replace at least one of the RF increasing module, the FE module, and the SR module with the model for image processing.

In some embodiments, the processor may further include a training module configured to train at least one of the RF increasing module, the FE module, and the SR module, based on the target image and a ground truth image.

In some embodiments, the processor may further include a WG module configured to generate weights for each layer of a feature extraction neural network based on a result of the RF increasing module.

In some embodiments, the MG module may be further configured to generate one or more models for each module to be replaced, based on context of the input image frame.

In some embodiments, the processor may be further configured to determine a module to be replaced with the model based on computing resources of the image processing apparatus.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIGS. 2A and 2B are block diagrams illustrating a processor, according to some embodiments of the present disclosure;

DETAILED DESCRIPTION

Figure 1:
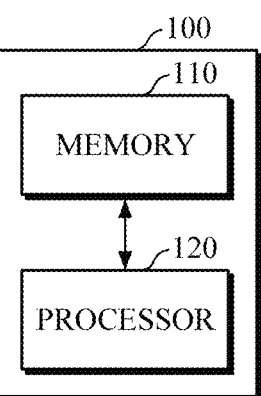
FIG. 1 is a block diagram illustrating an image processing apparatus, according to an embodiment of the present disclosure.

Details of other embodiments are included in the following detailed description and drawings. Advantages and features of the present disclosure, and a method of achieving the same may be more clearly understood from the following embodiments described in detail with reference to the accompanying drawings. Throughout the drawings and the detailed description, unless otherwise described, the same drawing reference numerals may be understood to refer to the same elements, features, and structures.

It is to be understood that, although terms such as "first", "second", and the like may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" may be understood to imply the inclusion of stated elements but not the exclusion of any other elements. Additionally, terms, such as "unit", "module," and the like, may be understood to refer to a unit that performs at least one function and/or operation and that may be embodied as hardware, software, and/or a combination thereof.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Hereinafter, various embodiments of the present disclosure are described with reference to the accompanying drawings.

FIG. 1 is a block diagram illustrating an image processing apparatus, according to an embodiment of the present disclosure.

Various embodiments of the image processing apparatus may be applied to an electronic device, such as, but not limited to, an edge device, which may need to perform conversion of a low frame rate and low-resolution image to a high frame rate and high-resolution image in an environment with limited computing resources. Examples of the electronic device may include various image transmission/reception devices, such as, but not limited to, mobile phones, televisions (TV), monitors, Internet of Things (IoT) devices, and the like, and may be applied to a large computing environment, such as, but not limited to, cloud computing, to allow for efficient use of computing resources during image processing.

Referring to FIG. 1, an image processing apparatus 100 includes a memory 110 and a processor 120.

The memory 110 may include a dynamic random access memory (DRAM) 1031 and a cache memory, but is not limited thereto. The memory 110 may store image data, such as images and/or videos input from an external device (e.g., camera, cloud device, electronic device, and the like). In addition, the memory 110 may store neural networks for image processing and/or image processing models (e.g., lookup table). In some embodiments, the processor 120 may refer to the memory 110 during image processing. In some embodiments, the image processing may include a super-resolution process and/or a frame interpolation process, but is not limited thereto. Further, the memory 110 may store results of image processing by the processor 120, for example, images subjected to super-resolution and/or frame interpolation.

The processor 120 may generate models for image processing and may store the generated models in the memory 110. In addition, in response to a request for image processing, the processor 120 may perform image processing by referring to the models stored in the memory 110.

Figure 2A:
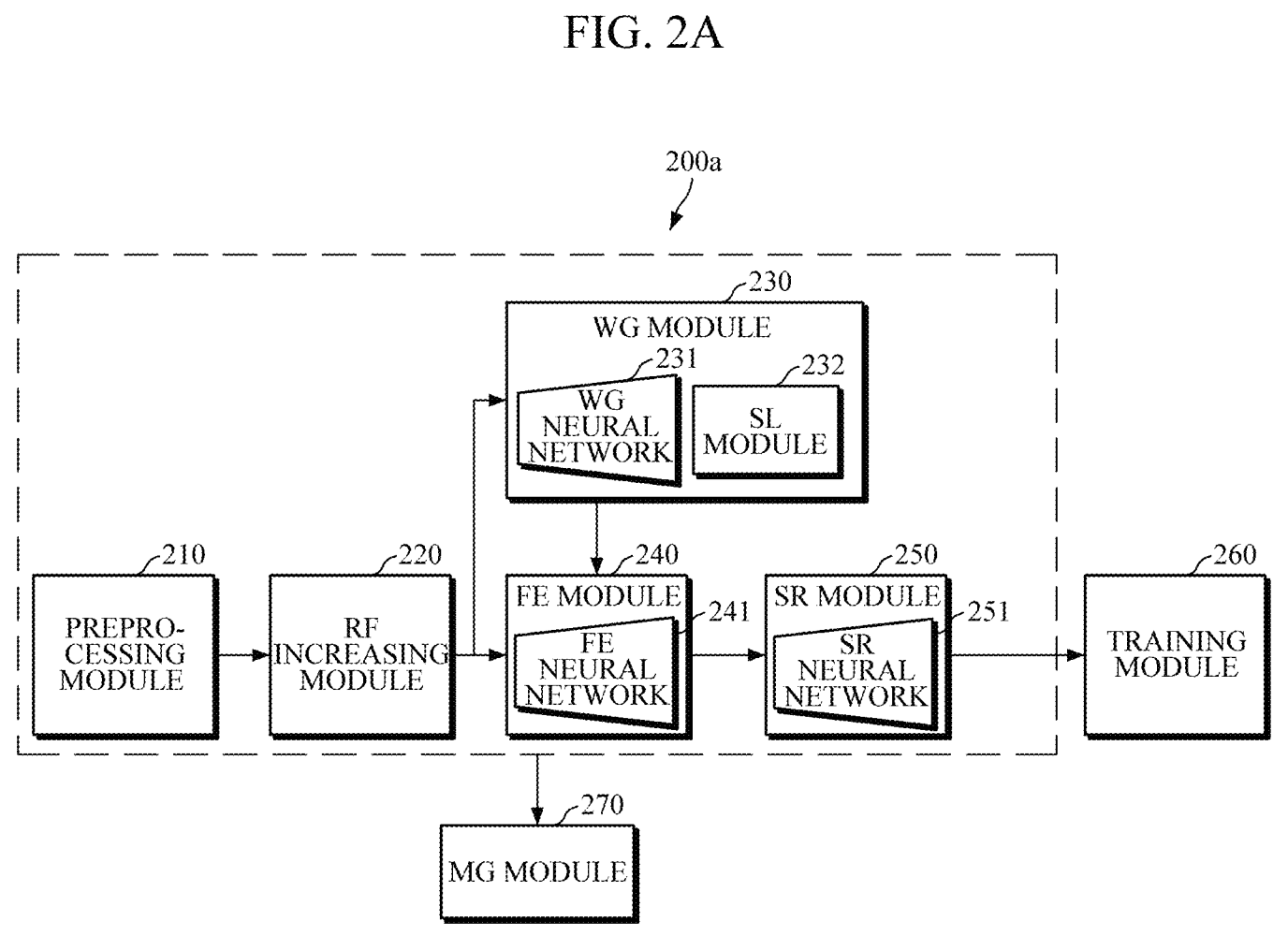
Figure 2B:
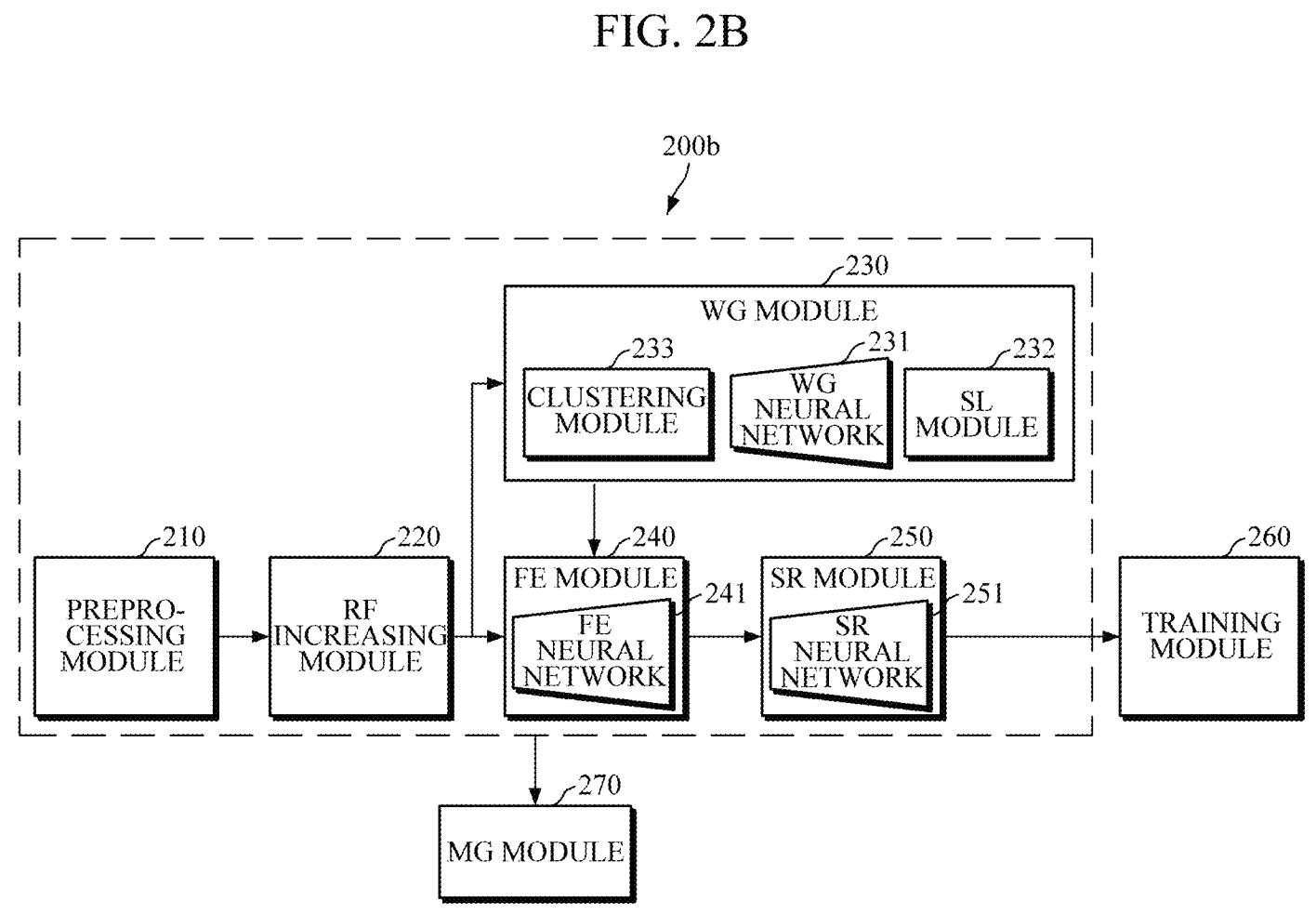

FIGS. 2A and 2B are block diagrams illustrating a processor, according to embodiments of the present disclosure.

Referring to FIGS. 2A and 2B, a processor (e.g., processor 200a of FIG. 2A, processor 200b of FIG. 2B) may generate an image processing model, and may include a preprocessing module 210, a receptive field (RF) increasing module 220, a weight generation (WG) module 230, a feature extraction (FE) module 240, a super-resolution (SR) module 250, a training module 260, and a model generation (MG) module 270. All or some of the modules may be and/or may include neural networks such as, but not limited to, deep neural network (DNN), convolution neural network (CNN), and the like. In addition, some components in each module may be and/or may include neural networks, and others may be and/or may include components for performing operation by referring to the memory 110.

The preprocessing module 210 may perform preprocessing on an input image. For example, the preprocessing module 210 may perform general image processing operations, such as, but not limited to, down sampling, normalization, and the like.

In some embodiments, the preprocessing module 210 may perform an operation of generating input data for efficient training during model generation. The following Equations 1 and 2 are examples of calibrating two input image frames for use as input to the RF increasing module 220.

$$I_{inp1} = I_1 - avg(I_1, I_2) \qquad \text{[Eq. 1]}$$

$$I_{inp2} = I_2 - avg(I_1, I_2)$$

$$I_{inp1} = int(I_1, I_2) - I_1 \qquad \text{[Eq. 2]}$$

$$I_{inp2} = I_2 - int(I_1, I_2)$$

Referring to Eqs. 1 and 2, $I_1$ and $I_2$ may represent input image frames, $I_{inp1}$ and $I_{inp2}$ may represent calibrated image frames that may be input to the RF increasing module 220, $avg(I_1, I_2)$ may represent a function that calculates an average value of the two image frames (e.g., $I_1$ and $I_2$), and $int(I_1, I_2)$ may represent a function that calculates an interpolated value between the two image frames (e.g., $I_1$ and $I_2$). The interpolated value may be calculated using any of various known interpolation functions. That is, the present disclosure is not limited in this regard.

The RF increasing module 220 may increase a receptive field of an input image frame by using the preprocessed image frame as an input, so that the FE module 240 may perform an operation by using surrounding information of a target pixel with the increased receptive field. A degree of increase of the receptive field may be determined based on context of an input image during training, a target level of super-resolution, computing resources (e.g., power consumption, memory footprint), and the like. For example, the RF increasing module 220 may include a component for performing down shuffle, channel-wise concatenation, and/or dimension reduction, and the like, so that the total amount of computation does not increase significantly while increasing the receptive field. However, the RF increasing module 220 is not limited thereto, and may be readily modified to have a UNet structure in order to increase the receptive field, or to perform pixel shuffle, depth-wise convolution, and the like.

The WG module 230 may generate weights for each layer of an FE neural network 241 included in the FE module 240. The WG module 230 may include a WG neural network 231 and a sparsity loss (SL) module 232. In addition, referring to FIG. 2B, the WG module 230 may further include a clustering module 233.

The WG neural network 231 may generate weights for each layer of the FE neural network 241. The WG neural network 231 may be a known neural network (e.g., Hyper Network). The WG neural network 231 may include various layers, such as a convolution layer, a fully connected layer, and the like, in order to output weights of the FE neural network by using the output of the RF increasing module as an input.

The SL module 232 may perform an operation to increase sparsity of the weights generated by the WG neural network 231. The SL module 232 may induce the sparsity of the weights by using a sparsity loss function (e.g., L1 loss function).

The clustering module 233 may cluster the output of the RF increasing module 220 using a clustering algorithm, so that a cluster value may be reflected in the WG neural network 231. The clustering algorithm may be and/or may include a Sinkhorn-Knopp algorithm, but is not limited thereto. The Sinkhorn-Knopp algorithm may be performed under equivalence partitioning conditions by defining a predetermined number of clusters, and a result thereof may be used as an input to the WG neural network 231. Accordingly, the weights generated by the WG neural network 231 may be clustered based on image characteristics. An input vector for clustering may be constructed by various methods, such as by directly embedding an output value of the RF increasing module 220 or by forwarding the output of the RF increasing module 220 to the FE module 240, to which weights up to the previous iteration are applied, and then embedding the output of a layer at a specific level, and the like.

The FE module 240 may extract features of the increased receptive field of an image frame, by using the output of the RF increasing module 220 as an input. The FE module 240 may apply the weight of each layer, which is the output of the WG module 230, to the FE neural network 241, and then may input the output of the RF increasing module 220 to the FE neural network 241. In addition, the FE module 240 may finally output a feature map by performing post-processing on the output of the FE neural network 241. For example, the FE module 240 may normalize values of the feature map by using a sigmoid function. In addition, the FE module 240 may quantize the values to discrete values by considering desired performance and importance of processing speed, and the like.

The SR module 250 may include an SR neural network 251 and may input the output of the FE module 240 to the SR neural network 251. The SR neural network 251 may include various layers of a general deep learning neural network, such as, but not limited to, convolution layer, fully connected layer, deconvolution layer, pixel shuffle, and the like.

The SR neural network 251 may output a target image by converting a resolution to a desired target resolution by using the feature map, generated by the FE module 240, as an input. In some embodiments, the target resolution may be a higher resolution (e.g., two (2) times) than that of the input image frame. The SR neural network 251 may divide the quantized values of the feature, extracted by the FE module 240, into units of a predetermined size, and may output a predicted pixel value of the target image for each unit.

The SR neural network 251 may be configured to perform super-resolution on an image and/or may also be configured to perform both super-resolution and frame interpolation at the same time. In the case of performing only the frame interpolation without performing the super-resolution on the image, the SR module 250 may further include a module for modifying the output of the SR neural network 251 to have the same resolution as the input image frame.

The training module 260 may train the entire framework including the modules 210 to 250 (e.g., preprocessing module 210, RF increasing module 220, WG module 230, FE module 240, and SR module 250) by using the target image, output by the SR module 250, and a ground truth image. The training module 260 may be composed of a combination of a L1 loss, a L2 loss, a distortion loss such as peak signal-to-noise ratio (PSNR) loss, and/or perceptual loss such as learned perceptual image patch similarity (LPIPS) loss, multi scale-structural similarity index measure (MS-SSIM) loss, and the like. The training module 260 may calculate loss by using a loss function, and may train the framework by using a back-propagation method so that the loss may be minimized.

Once the training of the modules 210 to 250 is complete, the MG module 270 may generate a model that replaces at least some of the modules 210 to 250. The model may be a lookup table that maps the input and output of a module to be replaced. For example, a lookup table that maps the input and output of the SR module 250 may be generated as an SR model, and some or all of the other modules may be replaced with a lookup table in consideration of computing resources (e.g., power consumption, memory footprint) of the image processing apparatus 100 and the like. One or more models that replace the respective modules may be generated based on the context of an image. The lookup table may be resized by adjusting a size unit used for dividing the quantized values of the feature extracted by the FE module 240, and/or by sampling.

In the case in which the WG module 230 generates the weights by reflecting cluster value, the MG module 270 may generate a lookup table to represent a predetermined value observed in the discrete values of the feature map generated by the FE module 240, and the pixel value predicted by the SR module for all combinations of the number of clusters used in training.

Figure 3:
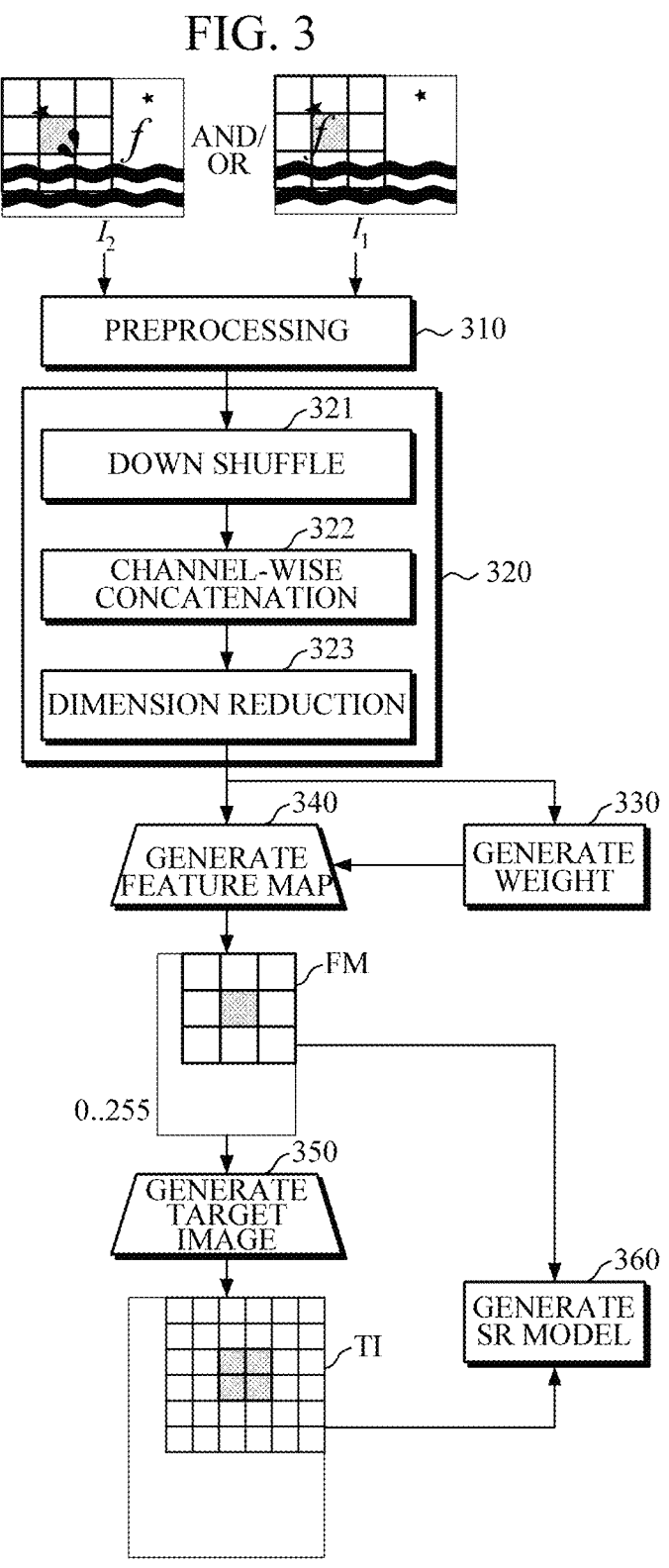
FIG. 3 is a diagram depicting an example of generating super resolution (SR) model, according to an embodiment of the present disclosure.

FIG. 3 is a diagram explaining an example of generating an SR model.

FIG. 3 depicts an example of generating an SR model that replaces an SR module in the embodiment in which super-resolution and frame interpolation are performed by using two image frames as input.

Training may be performed to interpolate a high-resolution third image frame, having width and height that are doubled from a first image frame $I_1$ and a second image frame $I_2$, which are low-resolution image frames. In some embodiments, the first and second image frames $I_1$ and $I_2$ may be first and third frames, and the third image frame may be a second image frame generated by interpolation.

The input first and second image frames $I_1$ and $I_2$, which are low-resolution image frames, may be preprocessed in operation 310 by the preprocessing module 210, to be input to the RF increasing module 220. The RF increasing module 220 performs operation 320 that may include performing a down shuffle in operation 321, followed by channel-wise concatenation in operation 322, so that a total amount of computation may not increase significantly while increasing the receptive field, and may perform dimension reduction in operation 323 to a size required for the FE neural network 241. By using the output of the RF increasing module 220 as an input to the WG module 230 and the FE module 240, weights are generated in operation 330 and a feature map is generated in operation 340.

The generated feature map FM is input to the SR module 250 such that super-resolution and frame interpolation are performed in operation 350, and a target image generated as a result of the process is output. The training module 260 performs training by using a back-propagation method based on a target image TI and a ground truth image, and in response to completion of the training, the MG module 270 may generate an SR model in operation 360 as a lookup table by mapping the feature map FM, used as an input to the SR module 250, to the target image TI which is an output of the SR module 250. In the process of generating the weights in 340, the weights may be generated for each of a plurality of clusters based on the context of an image. In some embodiments, a plurality of SR models may be generated for each of the clusters classified based on the context of the image.

Figure 4:
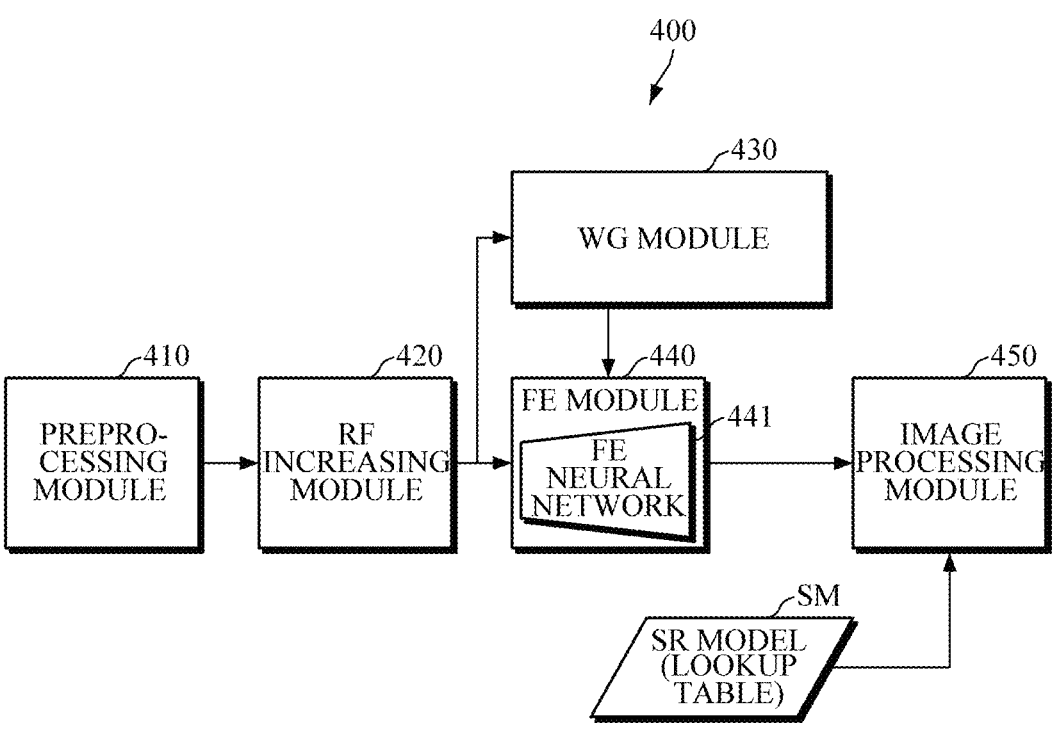
FIG. 4 is a block diagram illustrating a processor, according to an embodiment of the present disclosure.

FIG. 4 is a block diagram illustrating a processor, according to an embodiment of the present disclosure, in which image processing, such as, but not limited to, super-resolution and/or frame interpolation, and the like, is performed by using an SR model that replaces an SR module and is generated by the training and model generation described above.

Referring to FIG. 4, a processor 400 may include a preprocessing module 410, an RF increasing module 420, a WG module 430, an FE module 440, and an image processing module 450. As described above, one or all of the modules may be replaced with models, in which case modules that are replaced may be omitted. Components that are the same as those described above are be briefly described below for the sake of brevity.

If one or more image frames for image processing are input from an external device (e.g., camera, cloud, and the like) in response to a request for image processing (e.g., super-resolution and/or frame interpolation, and the like) being received from user input and the like, the preprocessing module 410 may perform general image processing operations, such as, but not limited to, down sampling, normalization, and the like, and/or generate data for use as an input to the RF increasing module 420 for efficient operation.

The RF increasing module 420 performs down shuffle, channel-wise concatenation, and/or dimension reduction to a size required by the FE neural network 241, and the like, so that a total amount of computation may not increase significantly while increasing the receptive field.

The WG module 430 may generate weights for each layer of the FE neural network 441 by using the output of the RF increasing module 420 as an input. The WG module 430 may include a WG neural network for generating weights and an SL module for inducing sparsity of the weights, and may include, if necessary, a clustering module for clustering the output of the RF increasing module 420, so that the WG neural network may generate weights by using clusters.

The FE module 440 may generate a feature map by applying the output of the WG module 430 to the FE neural network 441 and by forwarding the output of the RF increasing module 420 to the FE neural network 441. In some embodiments, the FE module 440 may normalize values of the feature map by using a sigmoid function, and the like, and/or may quantize the values to discrete values.

The image processing module 450 may receive the feature map output by the FE module 440 and output a super-resolution image by referring to the SR model SM previously generated and stored in the memory as described above. In the process of generating the weights in operation 340, the weights may be generated for each of a plurality of clusters based on the context of an image. In the case in which a plurality of SR models SM are generated for each of the clusters based on the context of the image, an SR model SM corresponding to an image cluster may be selected therefrom.

In the case of performing only frame interpolation without performing super-resolution on the input image frame, the image processing module 450 may convert the super-resolution image, generated by referring to the SR model SM, to the same resolution as the input image frame, and may output the converted image.

Figure 5:
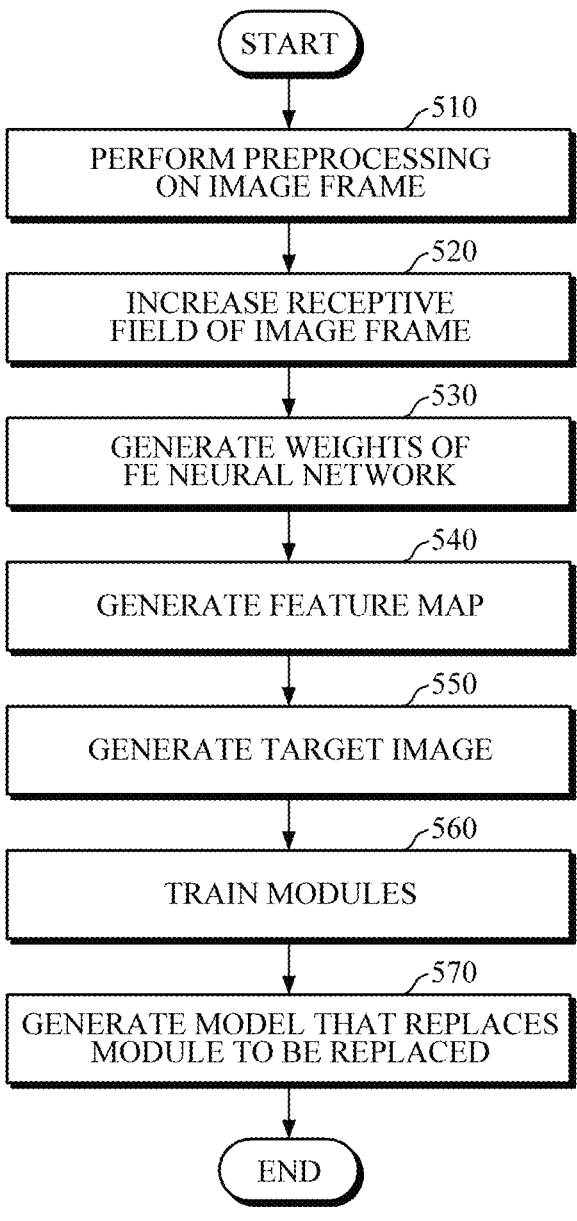
FIG. 5 is a flowchart illustrating a method of generating a model, according to an embodiment of the present disclosure.

FIG. 5 is a flowchart illustrating a method of generating a model, according to an embodiment of the present disclosure.

The method of FIG. 5 may be an example of a method of generating a model which is performed by the image processing apparatus 100 of FIG. 1, and is briefly described below for the sake of brevity.

The preprocessing module (e.g., preprocessing module 210 of FIGS. 2A and 2B, preprocessing module 410 of FIG. 4) may perform preprocessing on an input image frame in operation 510. The preprocessing may include general preprocessing operations, such as, but not limited to, down sampling, normalization, and the like, and/or an operation of generating data for use as input to the RF increasing module for efficient training.

The RF increasing module (e.g., RF increasing module 220 of FIGS. 2A and 2B, RF increasing module 420 of FIG. 4) may increase a receptive field of the preprocessed image frame in operation 520. The RF increasing module may perform down shuffle, channel-wise concatenation, dimension reduction, and the like for efficient operation while increasing the receptive field.

The WG module (e.g., WG module 230 of FIGS. 2A and 2B, WG module 430 of FIG. 4) may generate weights for each layer of the FE neural network based on a result of increasing the receptive field in operation 530. A general neural network for generating weights may be used, and a process of increasing sparsity of the generated weights may be performed. In addition, in order to generate weights for each cluster based on the context of an image, a process of clustering the output of the RF increasing module into a predetermined number of clusters.

The FE module (e.g., FE module 240 of FIGS. 2A and 2B, FE module 440 of FIG. 4) may generate a feature map in operation 540 by applying the generated weights to the FE neural network and by forwarding the image frame with an increased receptive field to the FE neural network. The FE module may normalize values of the feature map, or may quantize the values to discrete values.

The SR module (e.g., SR module 250 of FIGS. 2A and 2B) may generate a target image having a target resolution based on the generated feature map in operation 550. The SR module may divide the quantized values of the feature map into units of a predetermined size and may output a predicted pixel value of the target image for each unit. The size unit may be adjusted according to the size of a lookup table to be generated.

The training module (e.g., training module 260 of FIGS. 2A and 2B) may train modules (e.g., preprocessing module, RF increasing module, WG module, FE module, SR module) in operation 560 by using a back-propagation method based on the generated target image and a ground truth image. The training module may calculate loss by using a loss function consisting of a combination of L1 loss, L2 loss, a distortion loss such as, but not limited to, PSNR loss, and/or Perceptual Loss such as, but not limited to, LPIPS loss, MS-SSIM loss, and may train the modules by using a back-propagation method.

The MG module (e.g., MG module 270 of FIGS. 2A and 2B) may generate a model as a lookup table by mapping the input and output of a module to be replaced in operation 570. The lookup table to be generated may be resized by adjusting a size unit used for dividing the quantized values, or by sampling. The module to be replaced may be determined in consideration of computing power, image processing accuracy, and the like.

Figure 6:
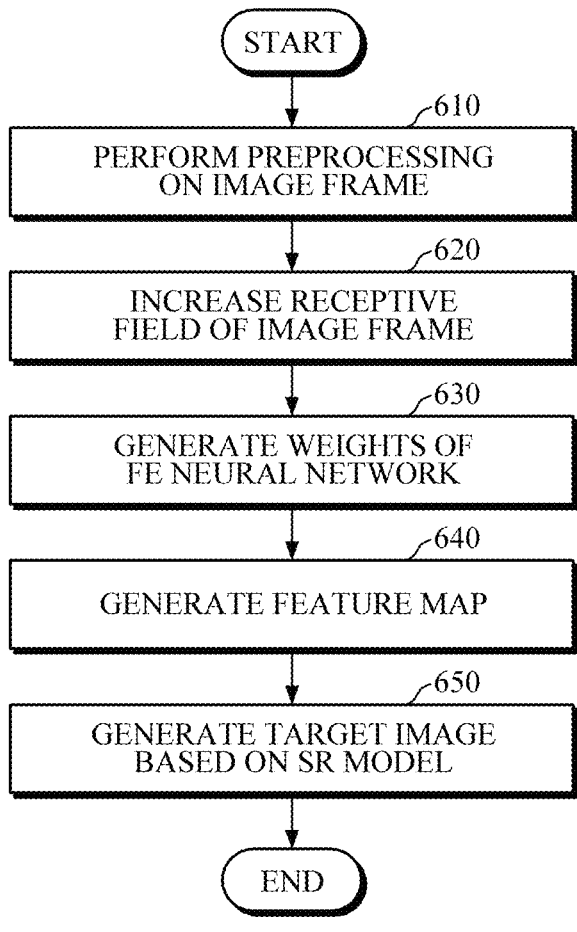
FIG. 6 is a flowchart illustrating an image processing method, according to an embodiment of the present disclosure.

FIG. 6 is a flowchart illustrating an image processing method, according to an embodiment of the present disclosure.

The method of FIG. 6 is an example of an image processing method performed by the image processing apparatus 100 of FIG. 1 by using a model that replaces an SR module, and are be briefly described below for the sake of brevity.

In response to input of one or more image frames for image processing from an external device (e.g., camera, cloud, and the like), the preprocessing module e.g., preprocessing module 210 of FIGS. 2A and 2B, preprocessing module 410 of FIG. 4) performs preprocessing on the input image frame as data for use as input to the RF increasing module in operation 610.

The RF increasing module (e.g., RF increasing module 220 of FIGS. 2A and 2B, RF increasing module 420 of FIG. 4) may increase a receptive field for the output of the preprocessing module from operation 610 by performing down shuffle, channel-wise concatenation, dimension reduction, and the like in operation 620.

The WG module (e.g., WG module 230 of FIGS. 2A and 2B, WG module 430 of FIG. 4) may generate weights for each layer of the FE neural network in operation 630 by using the output of the RF increasing module from operation 620 as an input. Once the weights are generated, a process of increasing sparsity of the generated weights may be performed. In addition, in order to generate weights for each cluster based on the context of an image, a process of clustering the output of the RF increasing module into a predetermined number of clusters.

The FE module (e.g., FE module 240 of FIGS. 2A and 2B, FE module 440 of FIG. 4) may generate a feature map in operation 640 by applying the output of the WG module from operation 630 to the FE neural network and by forwarding the output of the RF increasing module to the FE neural network. In some embodiments, a process of normalizing values of the feature map and/or quantizing the values to discrete values may be performed.

The image processing module (e.g., image processing module 450 of FIG. 4) may receive the feature map output by the FE module in operation 640 and output a super-resolution image and/or a target image, on which frame interpolation is performed, by referring to the SR model (e.g., lookup table SM of FIG. 4) stored in the memory in operation 650.

Figure 7:
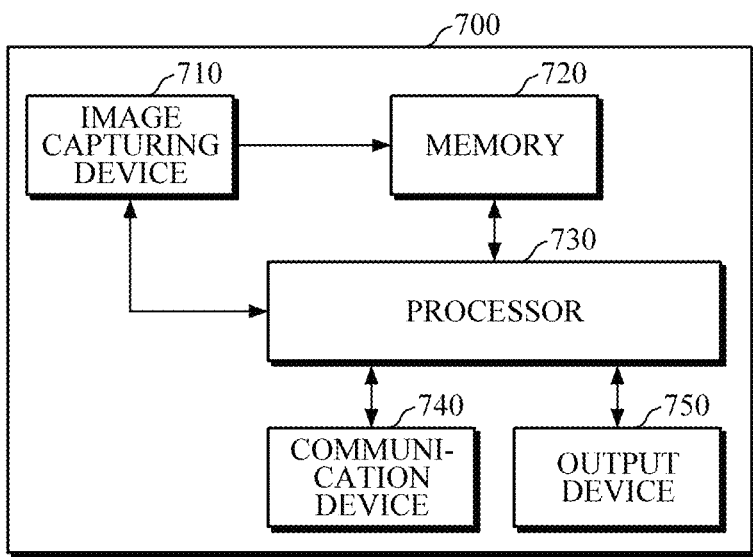
FIG. 7 is a block diagram illustrating an electronic device, according to an embodiment of the present disclosure.

FIG. 7 is a block diagram illustrating an electronic device, according to an embodiment of the present disclosure.

The electronic device 700 may include various embodiments of the aforementioned image processing apparatus. Examples of the electronic device may include an electronic device, such as, but not limited to, an edge device, which may need to perform conversion of a low frame rate and low-resolution image to a high frame rate and high-resolution image in an environment with limited computing resources, various image transmission/reception devices, such as, but not limited to, mobile phones, TV, monitors, IoT devices, as well as cloud computing devices, and the like.

Referring to FIG. 7, the electronic device 700 includes an image capturing device 710, a memory 720, a processor 730, a communication device 740, and an output device 750.

The image capturing device 710 may include a device, such as a camera and the like, for capturing still images and/or moving images, and the like, and may store the captured images in the memory 720. The image capturing device 710 may include a lens assembly having one or more lenses, image sensors, image signal processors, and/or flashes. The lens assembly included in a camera module may collect light emanating from a subject to be imaged.

The memory 720 may include a DRAM and/or a cache memory, but is not limited thereto. The memory 720 may store image data, such as images and/or videos captured by the image capturing device 710, image processing models generated by the processor 730 and/or neural networks. In addition, the memory 720 may store image processing results.

The processor 730 may include the modules of the image processing apparatus described above. The processor 730 may generate a model by performing a training process and a model generating process for replacing at least some of the modules, and may store the generated model in the memory 720. Once an image is input from the image capturing device 710 in response to a user's request for image processing, the processor 730 may perform image processing, such as, but not limited to, super-resolution and/or frame interpolation, and the like, by using models and/or neural networks stored in the memory 720. The processor 730 may include a main processor (e.g., a central processing unit (CPU) or an application processor (AP), and the like), an intellectual property (IP) core, and an auxiliary processor (e.g., a graphics processing unit (GPU), an image signal processor (ISP), a sensor hub processor, or a communication processor (CP)), and the like, which is operable independently from, or in conjunction with, the main processor.

The communication device 740 may support establishment of a direct (e.g., wired) communication channel and/or a wireless communication channel between the electronic device and other electronic device, a server, or the sensor device within a network environment, and performing of communication via the established communication channel, by using various communication techniques. A communication module may transmit the images captured by the image capturing device 710, and/or the data (e.g., image subjected to super-resolution and/or frame interpolation) processed by the processor 730 to another electronic device. In addition, the communication device 740 may receive an image to be processed from a cloud device or another electronic device, may store the received image in the memory 720, and may transmit the image to the processor 730 so that the image may be processed by the processor 730.

The output device 750 may visually/non-visually output the images captured by the image capturing device 710, and/or data processed by the processor 730. The output device may include a sound output device, a display device (e.g., display), an audio module, and/or a haptic module. The output device 750 may display a high-quality image, an image with improved image quality, and the like on the display, thereby improving user's image experience.

In some embodiments, the electronic device 700 may further include a sensor device (e.g., acceleration sensor, gyro sensor, geomagnetic sensor, proximity sensor, illuminance sensor, fingerprint sensor, and the like) configured to detect various data, an input device (e.g., a microphone, a mouse, a keyboard, and/or a digital pen (e.g., a stylus pen), and the like) configured to receive a command and/or data to be used from a user, and the like.

The present disclosure may be implemented as a computer-readable code written on a computer-readable recording medium. The computer-readable recording medium may be any type of recording device in which data is stored in a computer-readable manner. Computer-readable media includes computer storage media, which may be referred to as non-transitory computer-readable media. Non-transitory computer-readable media may exclude transitory signals. Storage media may be any available media that may be accessed by a computer.

Examples of the computer-readable recording medium may include, but not be limited to, a read-only memory (ROM), a random-access memory (RAM), an electrically erasable programmable ROM (EEPROM), a compact disc-ROM (CD-ROM), a magnetic tape, a floppy disc, an optical data storage, and a carrier wave (e.g., data transmission through the Internet). The computer-readable recording medium may be distributed over a plurality of computer systems connected to a network so that a computer-readable code is written thereto and executed therefrom in a decentralized manner. Functional programs, codes, and code segments needed for realizing the present disclosure may be readily inferred by those of ordinary skill in the art to which the present disclosure pertains.

The present disclosure has been described herein with regard to example embodiments. However, it may be apparent to those skilled in the art that various changes and modifications may be made without changing technical conception and essential features of the present disclosure. Thus, it is clear that the above-described embodiments are illustrative in all aspects and are not intended to limit the present disclosure.

What is claimed is:

1. A method of generating a model for image processing, the method comprising:
increasing, using a receptive field (RF) increasing module of at least one processor, a receptive field of an input image frame;
generating, using a feature extraction (FE) module of the at least one processor, a feature map based on the input image frame with the increased receptive field;
generating, using a super resolution (SR) module of the at least one processor, a target image having a target resolution, based on the feature map; and
generating, using a model generation (MG) module of the at least one processor, a replacement model that replaces at least one of the RF increasing module, the FE module, and the SR module,
wherein the replacement model comprises a lookup table that maps inputs of a module to be replaced to outputs of the module to be replaced.

2. The method of claim 1, further comprising:
preprocessing, using a preprocessing module of the at least one processor, the input image frame.

3. The method of claim 2, wherein the input image frame comprises a first image frame and a second image frame,
wherein the preprocessing of the input image frame comprises converting the first image frame and the second image frame based on at least one of an average value of the first image frame and the second image frame and an interpolated value between the first image frame and the second image frame, and
wherein the increasing of the receptive field of the input image frame comprises increasing, using the RF increasing module, a first receptive field of the first image frame and a second receptive field of the second image frame.

4. The method of claim 1, wherein the increasing of the receptive field of the input image frame comprises performing at least one of a down shuffle, a channel-wise concatenation, and a dimension reduction.

5. The method of claim 1, further comprising:
training, using a training module of the at least one processor, at least one of the RF increasing module, the FE module, and the SR module, the training module being based on the target image and a ground truth image,
wherein the generating of the replacement model comprises generating, based on completion of the training, the replacement model based on a training result.

6. The method of claim 1, wherein the generating of the replacement model comprises generating one or more replacement models for each module to be replaced, based on context of the input image frame.

7. The method of claim 1, further comprising:
generating, using a weight generation (WG) module of the at least one processor, weights for each layer of a feature extraction neural network based on a result of the increasing of the receptive field,
wherein the generating of the feature map comprises:
applying the weights to the feature extraction neural network; and
providing the result of the increasing of the receptive field to the feature extraction neural network.

8. The method of claim 7, wherein the generating of the feature map further comprises quantizing output values of the feature extraction neural network, and
wherein the generating of the target image comprises:
dividing the quantized output values into a plurality of units of a predetermined size; and
generating a predicted pixel value of the target image for each unit of the plurality of units.

9. The method of claim 8, wherein the generating of the replacement model comprises:
resizing the lookup table that replaces the SR module; and
performing, for each unit of the plurality of units, at least one of adjustment of a size unit and sampling.

10. The method of claim 7, wherein the generating of the weights comprises applying a predetermined sparsity to the weights of each layer of the feature extraction neural network.

11. The method of claim 7, wherein the generating of the weights comprises clustering, using a clustering algorithm, the result of the increasing of the receptive field.

12. The method of claim 1, further comprising:
performing at least one of super resolution, frame interpolation, and frame interpolation after super resolution.

13. The method of claim 12, wherein the generating of the target image comprises, based on performing only the frame interpolation, converting the target image having the target resolution to have a same resolution as at least one of a first frame of the input image frame and a second frame of the input image frame.

14. A non-transitory computer-readable recording medium storing one or more computer-executable programs including instructions for generating a model for image processing that, when executed by at least one processor of a device, cause the device to:
increase, using a receptive field (RF) increasing module of the at least one processor, a receptive field of an input image frame;
generate, using a feature extraction (FE) module of the at least one processor, a feature map based on the input image frame with the increased receptive field;
generate, using a super resolution (SR) module of the at least one processor, a target image based on the feature map, the target image having a target resolution; and
generate, using a model generation (MG) module of the at least one processor, a replacement model that replaces at least one of the RF increasing module, the FE module, and the SR module,
wherein the replacement model comprises a lookup table that maps inputs of a module to be replaced to outputs of the module to be replaced.

15. An image processing apparatus, comprising:
a memory configured to store a model for image processing; and
a processor configured to:
generate the model for image processing;
store the model for image processing in the memory; and perform image processing by using the model for image processing, wherein the processor comprises:

a receptive field (RF) increasing module configured to increase a receptive field of an input image frame;

a feature extraction (FE) module configured to generate a feature map based on the input image frame with the increased receptive field;

a super resolution (SR) module configured to generate a target image having a target resolution, based on the feature map; and a model generation (MG) module configured to generate the model for image processing and to replace at least one of the RF increasing module, the FE module, and the SR module with the model for image processing, wherein the model for image processing comprises a lookup table that maps inputs of a module to be replaced to outputs of the module to be replaced.

16. The image processing apparatus of claim 15, wherein the processor further comprises:

a training module configured to train at least one of the RF increasing module, the FE module, and the SR module, based on the target image and a ground truth image.

17. The image processing apparatus of claim 15, wherein the processor further comprises:

a weight generation (WG) module configured to generate weights for each layer of a feature extraction neural network based on a result of the RF increasing module.

18. The image processing apparatus of claim 15, wherein the MG module is further configured to:

generate one or more models for each module to be replaced, based on context of the input image frame.

19. The image processing apparatus of claim 15, wherein the processor is further configured to determine a module to be replaced with the model for image processing based on computing resources of the image processing apparatus.

* * * * *